(12) United States Patent
Yazami et al.

(10) Patent No.: US 9,923,208 B2
(45) Date of Patent: Mar. 20, 2018

(54) ELECTROLYTE MEMBRANE FOR LIQUID ANODE CELL BATTERY

(71) Applicants: Nanyang Technological University, Singapore (SG); TUM CREATE LIMITED, Singapore (SG)

(72) Inventors: Rachid Yazami, Singapore (SG); Kim Seng Tan, Singapore (SG); Yuxi Wang, Singapore (SG)

(73) Assignees: NANYANG TECHNOLOGICAL UNIVERSITY, Singapore (SG); TUM CREATE LIMITED, Singapore (SG)

( * ) Notice: Subject to any disclaimer, the term of this patent is extended or adjusted under 35 U.S.C. 154(b) by 0 days.

(21) Appl. No.: 14/889,002

(22) PCT Filed: May 12, 2014

(86) PCT No.: PCT/SG2014/000208
§ 371 (c)(1),
(2) Date: Nov. 4, 2015

(87) PCT Pub. No.: WO2014/182251
PCT Pub. Date: Nov. 13, 2014

(65) Prior Publication Data
US 2016/0149219 A1    May 26, 2016

Related U.S. Application Data

(60) Provisional application No. 61/821,967, filed on May 10, 2013.

(51) Int. Cl.
*H01M 4/62* (2006.01)
*H01M 4/13* (2010.01)
(Continued)

(52) U.S. Cl.
CPC ............ *H01M 4/628* (2013.01); *H01M 4/13* (2013.01); *H01M 4/381* (2013.01); *H01M 4/60* (2013.01); *H01M 4/62* (2013.01); *H01M 8/02* (2013.01); *H01M 8/1016* (2013.01); *H01M 10/052* (2013.01); *H01M 10/0562* (2013.01);
(Continued)

(58) Field of Classification Search
CPC ....................... H01M 10/052; H01M 10/0525
See application file for complete search history.

(56) References Cited

U.S. PATENT DOCUMENTS

| | | | |
|---|---|---|---|
| 5,314,765 A | 5/1994 | Bates | |
| 2007/0139862 A1* | 6/2007 | Tateishi | H01G 9/038 361/502 |

(Continued)

FOREIGN PATENT DOCUMENTS

WO    2014/092654 A1    6/2014

OTHER PUBLICATIONS

Bates et al., "Electrical properties of amorphous lithium electrolyte thin films," *Solid State Ionics* 53-56:647-654, 1992.
(Continued)

*Primary Examiner* — Olatunji Godo
(74) *Attorney, Agent, or Firm* — Seed IP Law Group LLP (57) ABSTRACT

The invention relates to an electrolyte membrane for a liquid anode cell battery. In particular, the electrolyte membrane is coated with a coating protective against decomposition of the electrolyte membrane in contact with a liquid anode.

26 Claims, 11 Drawing Sheets

(51) Int. Cl.
| | |
|---|---|
| H01M 10/052 | (2010.01) |
| H01M 4/38 | (2006.01) |
| H01M 10/0562 | (2010.01) |
| H01M 4/60 | (2006.01) |
| H01M 8/02 | (2016.01) |
| H01M 8/1016 | (2016.01) |
| H01M 10/36 | (2010.01) |
| H01M 10/054 | (2010.01) |
| H01M 10/056 | (2010.01) |

(52) U.S. Cl.
CPC .......... *H01M 10/36* (2013.01); *H01M 10/054* (2013.01); *H01M 10/056* (2013.01); *H01M 2300/0068* (2013.01); *H01M 2300/0094* (2013.01)

(56) References Cited

U.S. PATENT DOCUMENTS

| | | | |
|---|---|---|---|
| 2008/0044725 A1* | 2/2008 | Sadoway | H01M 2/0252 429/149 |
| 2009/0286114 A1* | 11/2009 | Visco | H01M 2/1646 429/421 |
| 2010/0141211 A1* | 6/2010 | Yazami | H01M 4/368 320/127 |
| 2010/0266907 A1 | 10/2010 | Yazami | |
| 2010/0316913 A1* | 12/2010 | Klaassen | H01M 4/13 429/303 |
| 2012/0183868 A1 | 7/2012 | Toussaint et al. | |
| 2012/0328927 A1 | 12/2012 | Timmons et al. | |

OTHER PUBLICATIONS

Bates et al., "Fabrication and characterization of amorphous lithium electrolyte thin films and rechargeable thin-film batteries," *Journal of Power Sources* 43-44:103-110, 1993.

Bates et al., "Thin-film lithium and lithium-ion batteries," *Solid State Ionics* 135:33-45, 2000.

Chung et al., "Lithium phosphorus oxynitride as a passive layer for anodes in lithium secondary batteries," *Journal of Eletroanalytical Chemistry* 566:263-267, 2004.

Dudney, "Addition of a thin-film inorganic solid electrolyte (Lipon) as a protective film in lithium batteries with a liquid electrolyte," *Journal of Power Sources* 89:176-179, 2000.

Dudney, "Solid-state thin-film rechargeable batteries," *Materials Science and Engineering B* 116:245-249, 2005.

Edwards, "The Electronic Properties of Metal Solutions in Liquid Ammonia and Related Solvents," *Advances in Inorganic Chemistry and Radiochemistry* 25:135-185, 1982.

Hasegawa et al., "Study on lithium/air secondary batteries—Stability of NASICON-type lithium ion conducting glass-ceramics with water," *Journal of Power Sources* 189:371-377, 2009.

Iriyama et al., "Charge-Transfer Reaction at the Lithium Phosphorus Oxynitride Glass Electrolyte/Lithium Manganese Oxide Thin-Film Interface and Its Stability on Cycling," *Journal of the Electrochemical Society* 153(5):A821-A825, 2006.

Iriyama et al., "Fast and Stable Charge Transfer Reaction at the $Li_{4/3}Ti_{5/3}O_4$/Lithium Phosphorus Oxynitride (LiPON) Interface and its Application to All-Solid-State Thin Film Batteries," *ECS Transactions* 16(26):45-52, 2009.

Lee et al., "Lithium Thin-Film Battery with a Reversed Structural Configuration SS/Li/Lipon/$Li_xV_2O_5$/Cu," *Electrochemical and Solid-State Letters* 6(12):A275-A277, 2003.

Lee et al., "Study on the LLT solid electrolyte thin film with LiPON interlayer intervening between LLT and electrodes," *Journal of Power Sources* 163:173-179, 2006.

Neudecker et al., "'Lithium-Free' Thin-Film Battery with In Situ Plated Li Anode," *Journal of the Electrochemical Society* 147(2):517-523, 2000.

Neudecker et al., "Lithium silicon tin oxynitride ($Li_y$SiTON): high-performance anode in thin-film lithium-ion batteries for microelectronics," *Journal of Power Sources* 81-82:27-32, 1999.

Puech et al., "Elaboration and characterization of a free standing LiSICON membrane for aqueous lithium—air battery," *Journal of Power Sources* 214:330-336, 2012.

Stevens et al., "Development of a lithium air rechargeable battery," *ECS Transaction* 28(32):1-12, 2010.

Tan et al., "Synthesis and Characterization of Biphenyl-Based Lithium Solvated Electron Solutions," *The Journal of Physical Chemistry B* 116:9056-9060, 2012.

West et al., "Chemical stability enhancement of lithium conducting solid electrolyte plates using sputtered LiPON thin films," *Journal of Power Sources* 126:134-138, 2004.

Xie et al., "Li-ion transport in all-solid-state lithium batteries with $LiCoO_2$ using NASICON-type glass ceramic electrolytes," *Journal of Power Sources* 189:365-370, 2009.

Yu et al., "A Stable Thin-Film Lithium Electrolyte: Lithium Phosphorus Oxynitride," *J. Electrochem. Soc.* 144(2):524-532, 1997.

Zhang et al., "Li/Polymer Electrolyte/Water Stable Lithium-Conducting Glass Ceramics Composite for Lithium-Air Secondary Batteries with an Aqueous Electrolyte," *Journal of The Electrochemical Society* 155(12):A965-A969, 2008.

* cited by examiner

ELECTROLYTE MEMBRANE FOR LIQUID ANODE CELL BATTERY

CROSS-REFERENCE TO RELATED APPLICATION

This application claims the benefit of priority of U.S. of America Provisional Patent Application No. 61/821,967, filed May 10, 2013, the contents of which being hereby incorporated by reference in its entirety for all purposes.

TECHNICAL FIELD

The invention relates to an electrolyte membrane for a liquid anode cell battery. In particular, the electrolyte membrane is coated with a coating protective against decomposition of the electrolyte membrane in contact with a liquid anode.

BACKGROUND

Solvated electron solution is a fundamental species in aqueous phase chemistry. The discovery of this species can be traced back to $18^{th}$ century. In a recent journal publication (K. S. Tan, A. C. Grimsdale, and R. Yazami: '*Synthesis and Characterization of Biphenyl-Based Lithium Solvated Electron Solutions*', *The Journal of Physical Chemistry B*, 2012, 116(30), 9056-9060), it is indicated that solvated electron solution, such as a lithium (Li) solvated electron solution (Li-SES), has the potential to be used in liquid-based batteries.

Much research efforts have since then been focused on producing liquid-based batteries. US Patent Publication Nos. 2010/0266907 and 2010141211, as well as PCT Application No. PCT/SG2013/000535 (entitled "Liquid Metal Battery", filed Dec. 13, 2013) are few of the examples of the research efforts.

In liquid-based batteries, ceramic membranes are typically used as electrolyte and separator, allowing ions or charge carriers transfer through them while separating the anodic and cathodic components. However, chemical stability of the electrolyte membranes in the solvated electron solution is very poor.

SUMMARY

Figure 5:
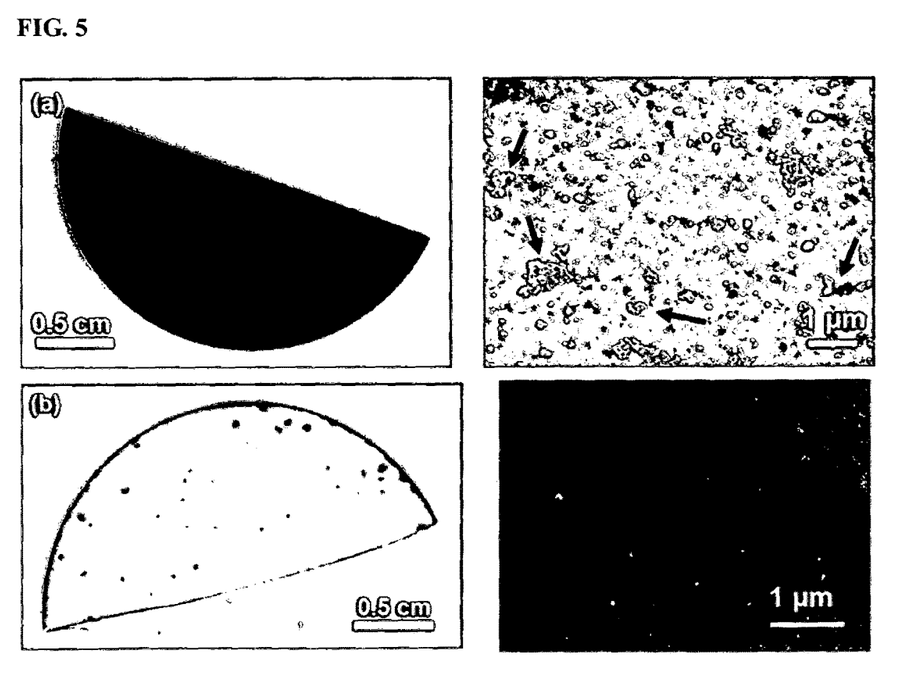

Present inventors have demonstrated that by modifying commercially available electrolyte membranes, specifically by providing a coating thereon, chemical stability of the coated electrolyte membranes in solvent electron solutions can be greatly enhanced. In one exemplary demonstration, a comparison of the chemical stability between pristine electrolyte membrane and coated electrolyte membrane immersed in Li-SES for 72 hours is shown in FIGS. 5(*a*) and 5(*b*).

Thus, in accordance with a first aspect of the disclosure, there is provided a liquid anode cell battery. The liquid anode cell battery includes a liquid anode including metal ions and an electron acceptor dissolved in a solvent. The liquid anode cell battery further includes an electrolyte membrane in contact with the liquid anode. The electrolyte membrane may be partially or completely coated with a coating protective against decomposition of the electrolyte membrane by the liquid anode.

Preferably, the coating includes a nitride, an oxide, or an oxynitride.

In one embodiment, lithium phosphorus oxynitride (LI-PON) is coated onto the electrolyte membrane to protect the electrolyte membrane against decomposition by the liquid anode.

In one embodiment, the liquid anode includes a Li-SES.

A second aspect of the disclosures relates to a battery system including a liquid anode cell battery of the first aspect and a liquid cathode. The electrolyte membrane is also in contact with the liquid cathode, thereby separating the liquid anode from the liquid cathode.

A further aspect of the disclosure refers to an electrolyte membrane for use in a liquid anode cell battery. The electrolyte membrane may be partially or completely coated with a nitride, an oxide, or, an oxynitride.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

FIG. 5(*a*) shows the pristine Ohara membrane immersed into Li-SES for 72 hours. FIG. 5(*b*) shows the LIPON coated Ohara membrane immersed into Li-SES for 72 hours.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and changes may be made without departing from the scope of the invention. The various embodiments are not necessarily mutually exclusive, as some embodiments can be combined with one or more other embodiments to form new embodiments.

Further, the terms and phrases used herein generally have their art-recognized meaning, which may be found by reference to standard texts, journal references and contexts known to those skilled in the art, including any patent documents cited herein. The following definitions are provided to clarify their specific use in the context of the invention.

The term "electron donor metal" refers to a metal which transfers one or more electrons to another. Examples of electron donor metals include, but are not limited to, alkali metals, alkali earth metals, and lanthanide metals. Further examples of electron donor metals include metals such as zinc, gallium and aluminum.

The terms "electron acceptor" and "electron receptor" are used interchangeably, and refer generally to one or more species that accommodates an electron donated by the electron donor metal. Examples of electron acceptor include, but are not limited to, polycyclic aromatic hydrocarbon (abbreviated herein as "PAH") and organic radicals, such as butyl radicals and acetyl radicals.

Electron donor metals and electron acceptors may combine to form a "solvated electron solution", which refers to a solution containing free electrons that are not bound to a solvent or solute molecule, and instead, occupy spaces between the solvent and/or solute molecules. These free electrons are termed "solvated electrons". A solvated electrons solution generally contains a metal that is partially or completely dissolved in a solution, and electron acceptors. Solutions containing a solvated electron can have a blue or green color, due to the presence of the solvated electron. Further, when a solvated electron solution is reacted with water, hydrogen gas is generated. Anodes including a solvated electron solution allow for significantly increased, energy density, specific power, and specific energy when compared with state of the art commercial lithium-ion based batteries.

The term "polycyclic aromatic hydrocarbon" (PAH) refers to a compound containing two or more aromatic rings. PAHs may include heterocyclic rings and heteroatom substitutions. Examples of polycyclic aromatic hydrocarbons include, but are not limited to, biphenyl, naphthalene, azulene, 1-methylnaphthalene, acenaphthene, acenaphthylene, anthracene, fluorene, phenalene, phenanthrene, benzo[a]anthracene, benzo[a]phenanthrene, chrysene, fluoranthene, pyrene, tetracene, triphenylene anthanthrene, benzopyrene, benzo[a]pyrene, benzo[e]fluoranthene, benzo[ghi]perylene, benzo[j]fluoranthene, benzo[k]fluoranthene, corannulene, coronene, dicoronylene, helicene, heptacene, hexacene, ovalene, pentacene, picene perylene, and tetraphenylene.

The term "anion receptor" refers to a molecule or ion which can bind to or otherwise take up an anion in solution. Anion receptors useful in the present solutions, formulations and methods include, but are not limited to, fluorinated and semifluorinated borate compounds, fluorinated and semifluorinated boronate compounds, fluorinated and semifluorinated boranes, phenyl boron compounds, aza-ether boron compounds, Lewis acids, cyclic polyammonium compounds, guanidinium compounds, calixarene compounds, aza-ether compounds, quaternary ammonium compounds, amines, imidazolinium based receptors, mercury metallacycle compounds, silicon containing cages, and macrocycles. Examples of calixarene compounds include cobaltocenium-based receptors, ferrocene-based receptors, π-metallated cationic hosts, calix[4]arenes, and calix[6]arenes. Examples of aza-ether anion receptors include linear aza-ethers, multi-branched aza-ethers, and cyclic aza-crown ethers. Examples of mercury metallacycle anion receptors include mercuracarborands and perfluoro-o-phenylenemercury metallacycles. Examples of anion receiving silicon-containing cages and macrocycles includes silsesquioxane cages and crown silanes.

The term "cation receptor" refers to a molecule which coordinates with the metal cation to form a soluble species, thus enabling dissolution of an insoluble metal compound such $Li_2O_2$. Crown ethers are a class of cation receptors exhibiting chemical and physical properties beneficial for enhancing the dissolution of inorganic fluorides, including LiF. These compounds are useful for complexing with metal ions in solution. Crown ether cation receptors useful in the present invention include, but are not limited to, Benzo-15-crown-5, 15-Crown-5, 18-Crown-6, Cyclohexyl-15-crown-5, Dibenzo-18-crown-6, Dicyclohexyl-18-crown-6, Di-t-butyldibenzo-18-crown-6, 4,4i⁻(5i⁻)-Di-tert-butyldibenzo-24-crown-8, 4-Aminobenzo-15-Crown-5, Benzo-15-Crown-5, Benzo-18-crown-6, 4-tert-Butylbenzo-15-crown-5, 4-tert-Butylcyclohexano-15-crown-5, 18-Crown-6, Cyclohexano-15-crown-5, Di-2,3-naphtho-30-crown-10, 4,4'(5')-Di-tert-butyldibenzo-18-crown-6, 4'-(5')-Di-tert-butyldicyclohexano-18-crown-6, 4,4'(5)-Di-tertbutyldicyclohexano-24-crown-8, 4,10-Diaza-15-crown-5, Dibenzo-18-crown-6, Dibenzo-21-crown-7, Dibenzo-24-crown-8, Dibenzo-30-crown-10, Dicyclohexano-18-crown-6, Dicyclohexano-21-crown-7, Dicyclohexano-24-crown-8, 2,6-Diketo-18-crown-6, 2,3-Naphtho-15-crown-5, 4'-Nitrobenzo-15-crown-5, Tetraaza-12-crown-4 tetrahydrochloride, Tetraaza-12-crown-4 tetrahydrogen sulfate, 1,4,10,13-Tetraoxa-7,16-diazacyclooctadecane, 12-crown-4, 15-crown-5, and 21-crown-7.

The term "organic radical" refers to an organic molecule having an unpaired electron.

The term "solvent" refers to a liquid that at least substantially or completely dissolves a solid, liquid, or gaseous solute, resulting in a solution. Liquid solvents can dissolve electron acceptors (such as polycyclic aromatic hydrocarbons) and electron donor metals in order to facilitate transfer of electrons from the electron donor metal to the electron acceptor. Examples of solvents include, but are not limited to, tetrahydrofuran, water, hexane, ethylene carbonate, propylene carbonate, benzene, carbon disulfide, carbon tetrachloride, diethyl ether, ethanol, chloroform, ether, dimethyl ether, benzene, propanol, acetic acid, alcohols, isobutylacetate, n-butyric acid, ethyl acetate, N-methylpyrrolidone, N,N-dimethyl formiate, ethylamine, isopropyl amine, hexamethylphosphotriamide, dimethyl sulfoxide, tetralkylurea, triphenylphosphine oxide.

The term "electrochemical cell" or "cell" refers to a device that converts chemical energy into electrical energy, or electrical energy into chemical energy. Generally, electrochemical cells have two or more electrodes and an electrolyte, wherein electrode reactions occurring at the electrode surfaces result in charge transfer processes. Examples of electrochemical cells include, but are not limited to, batteries and electrolysis systems.

The term "electrode" may refer to a "cathode" or an "anode". The terms "cathode" and "positive electrode" are used interchangeably, and refer to the electrode having the higher of electrode potential in an electrochemical cell (i.e. higher than the negative electrode). Conversely, the terms "anode" and "negative electrode", which are used interchangeably, refer to the electrode having the lower of electrode potential in an electrochemical cell (i.e. lower than the positive electrode). Cathodic reduction refers to a gain of electron(s) of a chemical species, and anodic oxidation refers to a loss of electron(s) of a chemical species.

"Electrode potential" refers to a voltage, usually measured against a reference electrode, due to the presence within or in contact with the electrode of chemical species at different oxidation (valence) states.

The term "electrolyte" refers to an ionic conductor which may be in a solid state, including in a gel form, or in a liquid state. In the present context, the electrolyte membrane is in solid state.

The terms "charge" and "charging" refer to process of increasing electrochemical potential energy of an electrochemical cell, which may take place by replacement of or addition of depleted active electrochemical materials with new active compounds. The term "electrical charging" refers to process of increasing electrochemical potential energy of an electrochemical cell by providing electrical energy to the electrochemical cell.

The term "metal salt" refers to an ionic species which comprises a metal cation and one or more counter anions, such that the metal salt is charge neutral, for example, having a net charge of zero.

In a first aspect, a liquid anode cell battery is disclosed. The liquid anode cell battery includes a liquid anode including metal ions and an electron acceptor dissolved in a solvent. The liquid anode cell battery further includes an electrolyte membrane in contact with the liquid anode. The electrolyte membrane may be partially or completely coated with a coating protective against decomposition of the electrolyte membrane by the liquid anode.

For example, the electrolyte membrane may be completely coated on all surfaces of the electrolyte membrane.

Alternatively, the electrolyte membrane may be completely coated only on surfaces in contact with the liquid anode.

Figure 1:
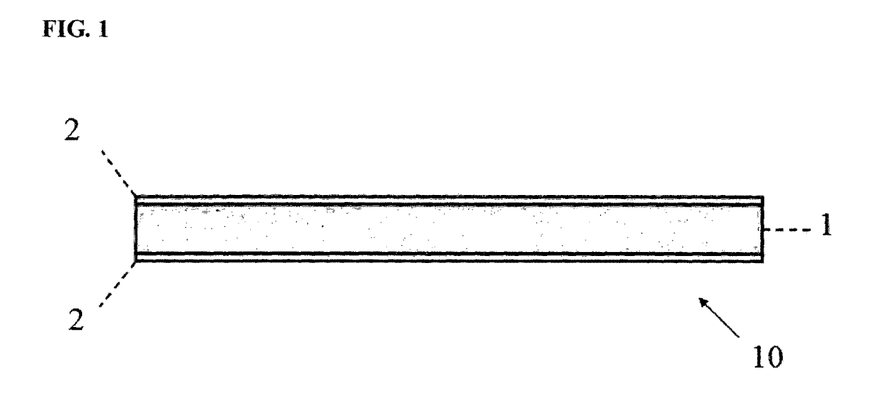
FIG. 1 shows a schematic of a coated electrolyte membrane.

FIG. 1 shows a schematic of the coated electrolyte membrane 10. The electrolyte membrane 1 is coated on both major surfaces 2 as shown. In alternative embodiments, only one major surface 2 may be coated. In further embodiments, the coating may be applied on the entire major surface 2. Alternatively, the coating may be applied on selected portions of the major surface 2. Although not shown in the figure, it is also to be appreciated that the minor (side) surfaces may or may not be provided with the protective coating.

In various embodiments, the metal ions may be selected from the group consisting of ions of an alkali metal, an alkali-earth metal and a lanthanide metal. For example, the metal is lithium, sodium or magnesium. Preferably the metal is lithium.

In various embodiments, the electron acceptor may be a polycyclic aromatic hydrocarbon selected from the group consisting of biphenyl, naphthalene, azulene, 1-methylnaphthalene, acenaphthene, acenaphthylene, anthracene, fluorene, phenalene, phenanthrene, benzo[a]anthracene, benzo[a]phenanthrene, chrysene, fluoranthene, pyrene, tetracene, triphenylene anthanthrene, benzopyrene, benzo[a]pyrene, benzo[e]fluoranthene, benzo[ghi]perylene, benzo[j]fluoranthene, benzo[k]fluoranthene, corannulene, coronene, dicoronylene, helicene, heptacene, hexacene, ovalene, pentacene, picene perylene, tetraphenylene, and a mixture thereof.

Alternatively, the electron acceptor may be selected from ammonia, polyaromatic-amines, metal-azaporphyrinates, diimines, methylamine, and a mixture thereof. For example, the electron acceptor may be 2-amino anthracene, 1-amino anthracene, 2-amino-chrysene, or 1-napthylamine.

In one embodiment, the electron acceptor in the liquid anode is biphenyl.

In another embodiment, the electron acceptor in the liquid anode is naphthalene.

Besides the above-mentioned, organic radicals, such as butyl radicals and acetyl radicals, may also be used as the electron acceptor. For example, the electron acceptor may be an alkyl radical, an alkene radical, or an alkyne radical. In embodiments where the electron acceptor is an alkyl radical, the electron acceptor may be n-butyl radical or ter-butyl radical.

The electron acceptor is dissolved in a solvent, such as an organic solvent. In various embodiments, the solvent may be selected from the group consisting of comprises tetrahydrofuran, water, hexane, ethylene carbonate, propylene carbonate, benzene, carbon disulfide, carbon tetrachloride, diethyl ether, ethanol, chloroform, ether, dimethyl ether, benzene, propanol, acetic acid, alcohols, isobutylacetate, n-butyric acid, ethyl acetate, N-methylpyrrolidone, N,N-dimethyl formiate, ethylamine, isopropyl amine, hexamethylphosphotriamide, dimethyl sulfoxide, tetralkylurea, triphenylphosphine oxide, and a mixture thereof. For example, the solvent may be tetrahydrofuran.

In one embodiment, the electron acceptor is biphenyl dissolved in tetrahydrofuran.

In various embodiments, the coating may be comprised of a nitride, an oxide, or an oxynitride.

In various embodiments where the coating may be comprised of an oxynitride, the coating may include an oxynitride of boron, phosphorous, aluminum, silicon, germanium, titanium, zirconium, magnesium, calcium, barium, zinc, gallium, indium or a lanthanide metal.

Figure 2:
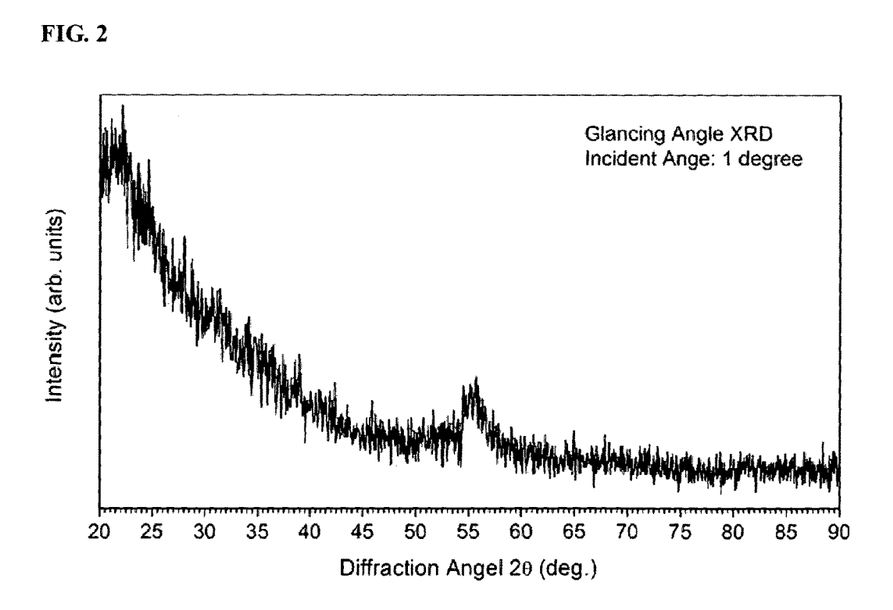
FIG. 2 shows a XRD (x-ray diffraction) pattern of LIPON thin film coating.
Figure 3:
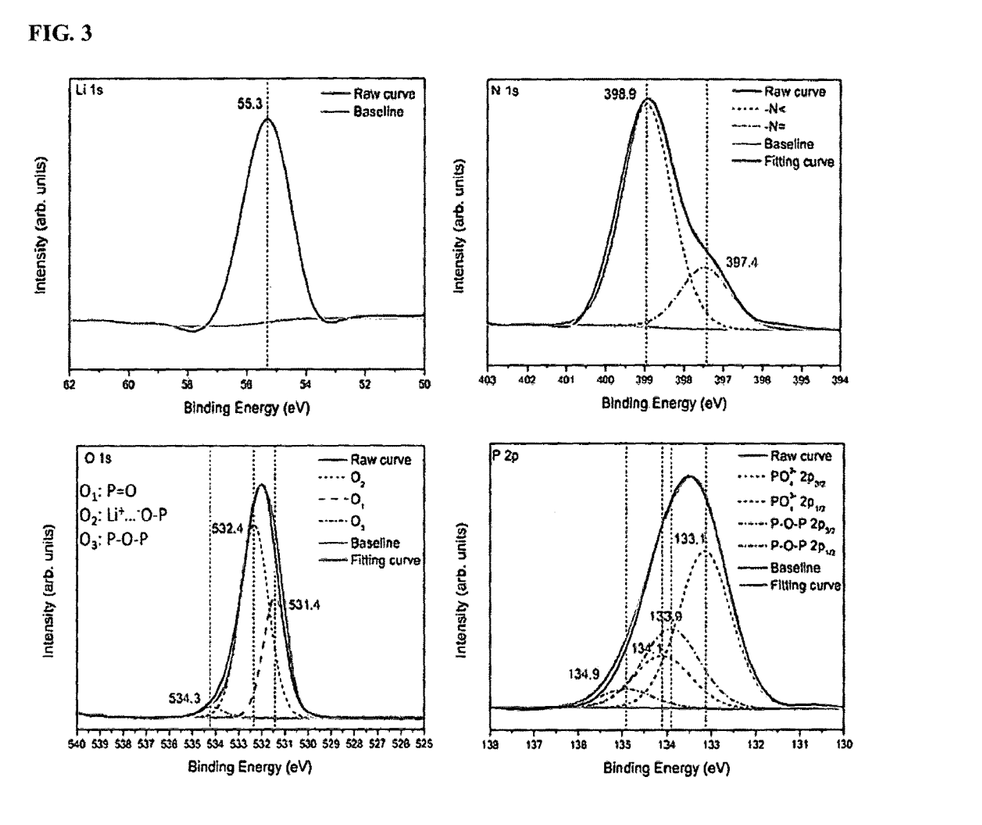
FIG. 3 shows the chemical state of the LIPON thin film coating.

In one embodiment, the coating may be comprised of lithium phosphorus oxynitride (LIPON). The LIPON coating may be in an amorphous state, as analyzed from XRD pattern (FIG. 2). FIG. 3 shows the chemical state of the LIPON thin film coating.

Table 1 below lists the chemical composition of the LIPON thin film coating.

| Element | Chemical concentration |
| --- | --- |
| Li | 31.0 ± 1.5 at. % |
| N | 3.9 ± 0.5 at. % |
| O | 54.7 ± 2.2 at. % |
| P | 10.4 ± 0.6 at. % |

Table 1 Lists the Chemical Composition of the LIPON Thin Film Coating

The LIPON coating may be deposited by convention deposition technique such as, but not limited to, magnetron sputtering technique. Table 2 below illustrates the deposition parameters used for fabricating a LIPON thin film in one embodiment.

Depending on the thickness desired for the coating, the deposition parameters may be manipulated accordingly. For example, the deposition period may be adjusted. In exemplary illustration, the protective coating may be less than 1 µm thick, preferably 500 nm or less.

| LiPON Fabrication | |
| --- | --- |
| Base pressure (Pa) | <5 × 10$^{-5}$ |
| Working pressure (Pa) | 0.53 |
| Ar:N$_2$ gas pressure ratio | 10:20 (sccm) |
| Plasma etching (min) | 15 |
| RF Power density of Li$_3$PO$_4$ (W/cm$^2$) | 3.3 |
| Deposition period (sec) | 8400 |

Table 2 Illustrates the Deposition Parameters Used for Fabriating a LIPON Thin Film In various embodiments where the coating may be comprised of a nitride, the coating may include a nitride of boron, phosphorous, aluminum, silicon, germanium, titanium, zirconium, magnesium, calcium, barium, zinc, gallium, indium or a lanthanide metal.

In alternative embodiments where the coating may be comprised of an oxide, the coating may include an oxide of boron, phosphorous, aluminum, silicon, germanium, titanium, zirconium, magnesium, calcium, barium, zinc, gallium, indium or a lanthanide metal.

In various embodiments, the electrolyte membrane may be comprised of a ceramic. In one example, the electrolyte membrane may be comprised of a NASICON-type ceramic, commonly known as Ohara membrane to person skilled in the art.

To demonstrate the improved stability of the coated electrolyte membrane provided by the protective coating, in one example an Ohara membrane coated with LIPON and a pristine Ohara membrane (i.e. without coating) are immersed in a lithium solvated electron solution (Li-SES). After immersion for 72 hours, the respective Ohara membrane is retrieved from the solution and analyzed. The results are briefly summarized as follows.

Figure 4:
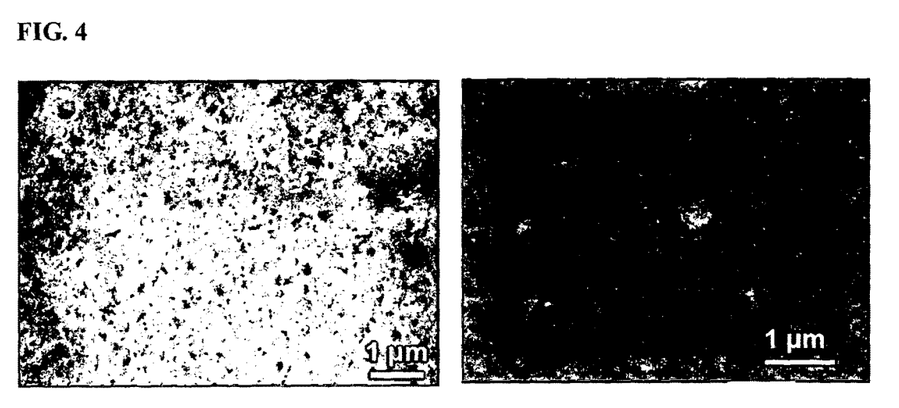
FIG. 4 shows a pristine Ohara membrane (left) and a LIPON coated Ohara membrane (right).

FIG. 4 shows a pristine Ohara membrane (left) and a LIPON coated Ohara membrane (right).

FIG. 5(a) shows the pristine Ohara membrane immersed into Li-SES for 72 hours. It is obvious that the surface turns to black and a number of precipitated agglomerations can be observed.

In contrast, FIG. 5(b) shows that for the LIPON coated Ohara membrane immersed into Li-SES for 72 hours, the coated surface remains white and no precipitated cluster can be found on the coated surface.

Table 3 and Table 4 show the surface composition change before and after the immersing test in Li-SES for the respective Ohara membrane (determined from XPS analyses). The chemical composition of pristine Ohara membrane changes dramatically. However, the chemical composition of LIPON coated Ohara membrane remains the same.

| Element | Before (at. %) | After (at. %) |
| --- | --- | --- |
| O | 66.4 ± 2.4 | 60.7 ± 3.7 |
| Ti | 2.5 ± 0.6 | nil |
| P | 11.5 ± 0.3 | nil |
| Si | 1.1 ± 0.3 | 1.1 ± 0.5 |
| Al | 3.5 ± 0.2 | nil |
| Li | 10.0 ± 0.7 | 32.8 ± 2.1 |
| Ge | 3.4 ± 0.4 | nil |

Table 3 Shows the Surface Composition Change Before and after Immersing Pristine Ohara Membrane in Li-SES

| Element | Before (at. %) | After (at. %) |
| --- | --- | --- |
| O | 54.7 ± 2.2 | 56.1 ± 3.5 |
| Li | 31.0 ± 1.5 | 38.2 ± 3.9 |
| N | 3.9 ± 0.5 | 3.0 ± 0.3 |
| P | 10.4 ± 0.6 | 8.1 ± 0.7 |

Table 4 Shows the Surface Composition Change Before and after Immersing LIPON Coated Ohara Membrane in Li-SES Based on the above results, present inventors have therefore demonstrated that Ohara membrane with LIPON coating can be much more stable than a pristine membrane immersed in Li-SES. In addition, present inventors have surprisingly found that by coating the electrolyte membrane with LIPON coating, the measured open circuit voltage (OCV) of the liquid anode cell battery can be enhanced by at least about 9-12% compared to the theoretical value (see Example 3 below).

In another aspect, there is disclosed a battery system including a liquid anode cell battery as described above and a liquid cathode. The electrolyte membrane may also in contact with the liquid cathode, thereby separating the liquid anode from the liquid cathode.

In various embodiments, surfaces of the electrolyte membrane in contact with the liquid cathode may be coated with the same protective coating as described above.

The liquid cathode may be exposed to air or oxygen.

In order that the invention may be readily understood and put into practical effect, particular embodiments will now be described by way of the following non-limiting examples.

EXAMPLES

Example 1

A full cell configuration Li-SES anolyte versus iodine catholyte using LIPON as a protective coating is demonstrated. The initial cell is in charged state, i.e. chemically prepared Li-SES and iodine. This cell uses both liquid-based anode (anolyte) and cathode (catholyte) and allows for fast ion transport and stable electrode/electrolyte interface.

Details on the set-up and configuration of the cell are described in US Patent Publication Nos. 2010/0266907 and 2010141211, the contents of which are incorporated herein in their entirety.

Figure 6:
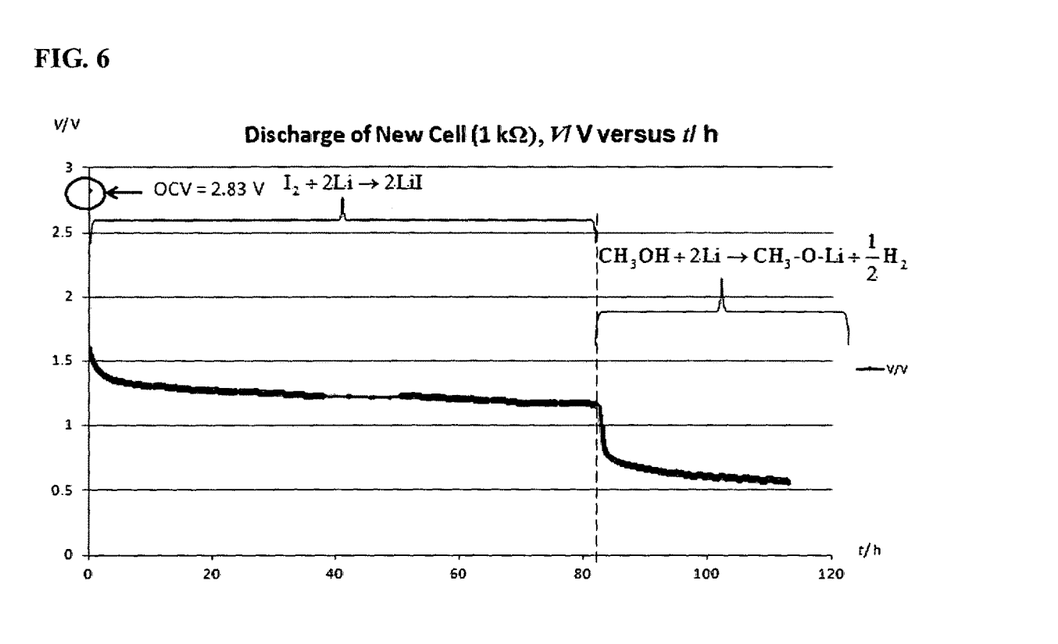
FIG. 6 shows the discharge curve of biphenyl-based LiSES vs iodine for a uncoated Ohara membrane illustrated in Example 1.

Discharge curve of biphenyl-based LiSES vs iodine for a uncoated Ohara membrane is shown in FIG. 6 (constant resistance of 1 kohm).

Figure 7:
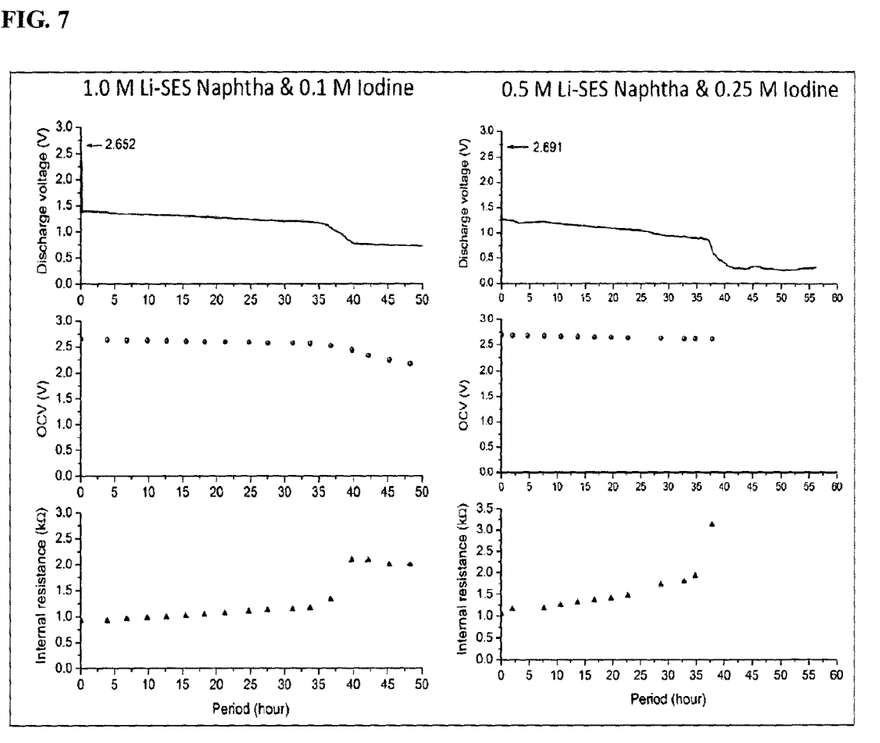
FIG. 7 shows the discharge curve of naphthalene-based LiSES vs iodine for a uncoated Ohara membrane illustrated in Example 1.
Figure 8:
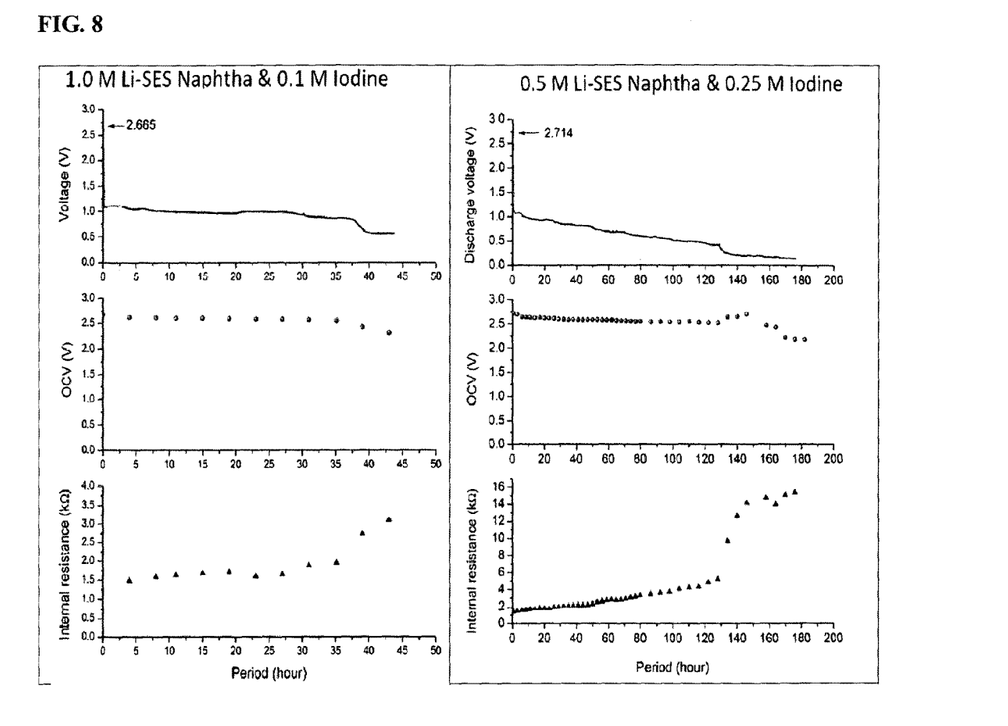
FIG. 8 shows the discharge curve of naphthalene-based LiSES vs iodine for a coated Ohara membrane illustrated in Example 1.

Discharge curves of naphthalene-based LiSES vs iodine for uncoated/coated Ohara membranes are shown in FIG. 7 and FIG. 8, respectively. From the results shown, for LIPON coated membranes, the membranes did not break at the end of the discharge.

Example 2

A full cell configuration Li-SES anolyte versus iodine catholyte using LIPON as a protective coating is demonstrated. However, in this example, the initial cell is an uncharged state electrochemically prepared Li-SES and iodine. In other words, the cells can be prepared in uncharged states with Li-SES and iodine both absent initially. This allows for long-term safe storage and transportation.

Details on the set-up and configuration of the cell are described in PCT Application No. PCT/SG2013/000535 (entitled "Liquid Metal Battery", filed Dec. 13, 2013), the contents of which are incorporated herein in their entirety.

Figure 9:
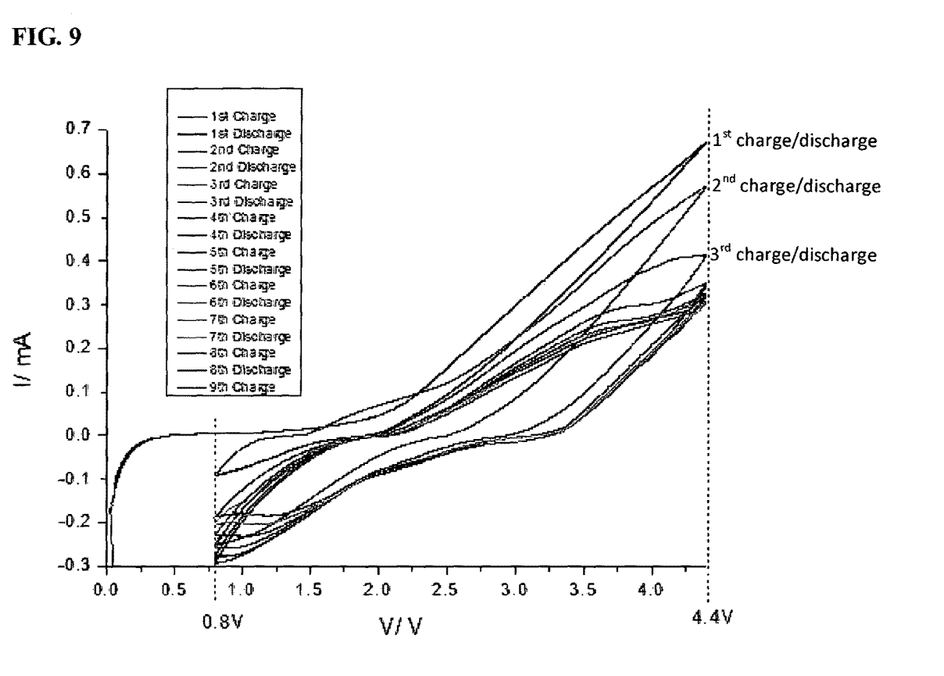
FIG. 9 shows the discharge/charge curve for an initial cell in an uncharged state electrochemically prepared Li-SES and iodine illustrated in Example 2.

The discharge/charge curve is shown in FIG. 9, where the anode is LiI in biphenyl in THF and cathode is LiI in methanol. The cell stabilizes after the 3$^{rd}$ cycle. At the 9$^{th}$ cycle, the Li-SES concentration is about 0.01 M/L.

Example 3

In this example, a full cell configuration Li-SES anolyte versus iodine catholyte using LIPON as a protective coating described in Example 1 is illustrated. Two types of cell configuration are used: (i) 1.0 M biphenyl-based Li-SES vs 0.1 M iodine; and (ii) 1.0 M naphtha-based Li-SES vs 0.1 M iodine.

Figure 10A:
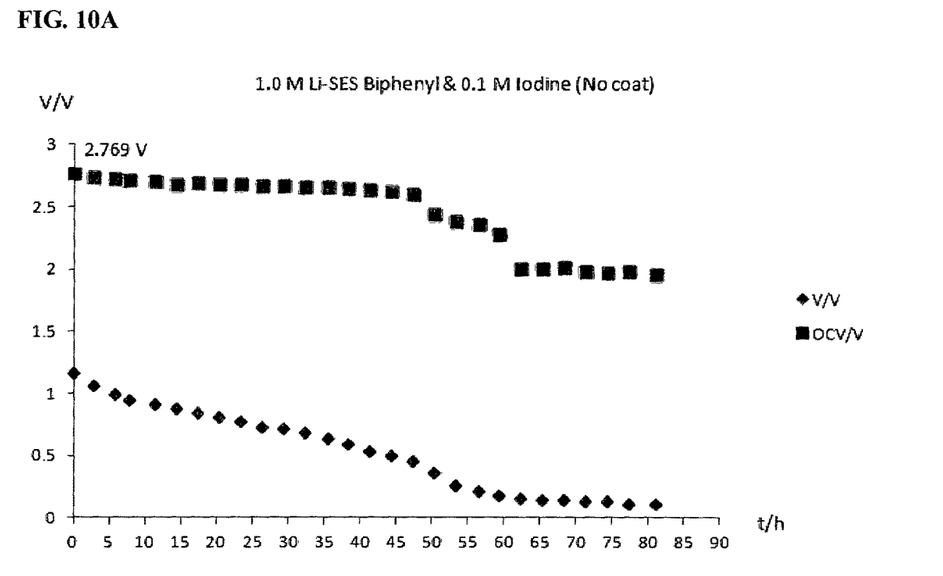
FIG. 10A shows the discharge curve of biphenyl-based Li-SES vs iodine for an uncoated electrolyte membrane illustrated in Example 3.

FIG. 10A shows the discharge curve of a 1.0 M biphenyl-based Li-SES vs 0.1 M iodine cell for an uncoated electrolyte membrane. The measured OCV is about 2.77 V.

Figure 10B:
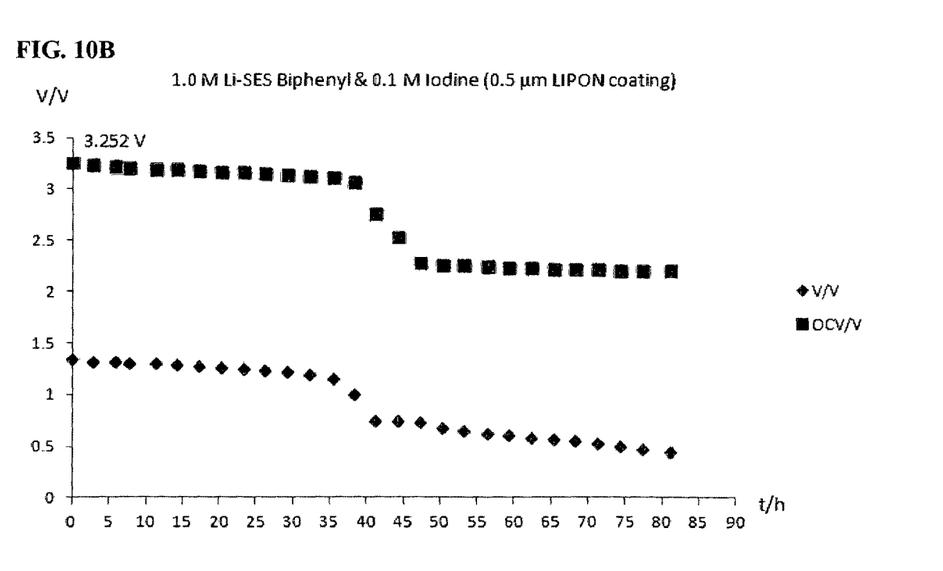
FIG. 10B shows the discharge curve of biphenyl-based Li-SES vs iodine for an electrolyte membrane coated with a 0.5 μm LIPON protective coating illustrated in Example 3.

FIG. 10B shows the discharge curve of a 1.0 M biphenyl-based Li-SES vs 0.1 M iodine cell for an electrolyte membrane coated with a 0.5 μm LIPON protective coating. The measured OCV is about 3.25 V.

The theoretical OCV of a 1.0 M biphenyl-based Li-SES vs 0.1 M iodine cell is about 2.91 V. Based on the measured OCV of about 3.25 V for a coated electrolyte membrane, about 12% enhancement over the theoretical OCV can be achieved by providing a protective coating to the electrolyte membrane.

Figure 11A:
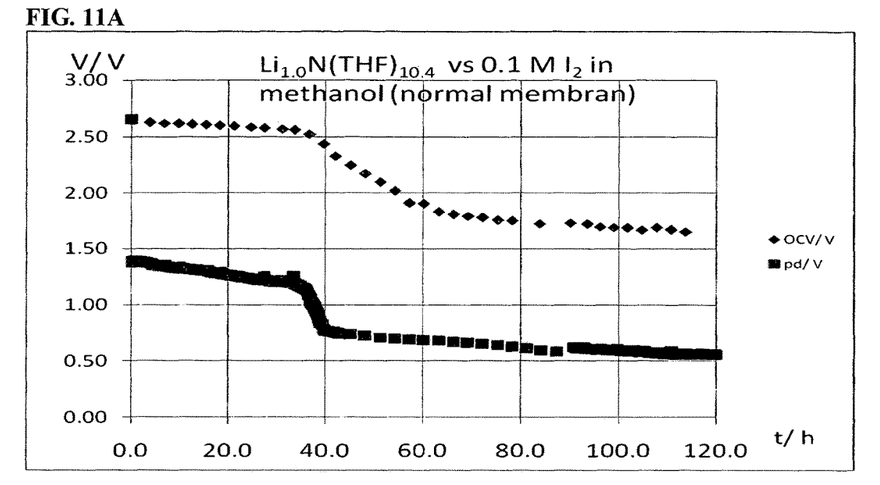
FIG. 11A shows the discharge curve of naphtha-based Li-SES vs iodine for an uncoated electrolyte membrane illustrated in Example 3.

FIG. 11A shows the discharge curve of a 1.0 M naphtha-based Li-SES vs 0.1 M iodine cell for an uncoated electrolyte membrane. The measured OCV is about 2.65 V.

Figure 11B:
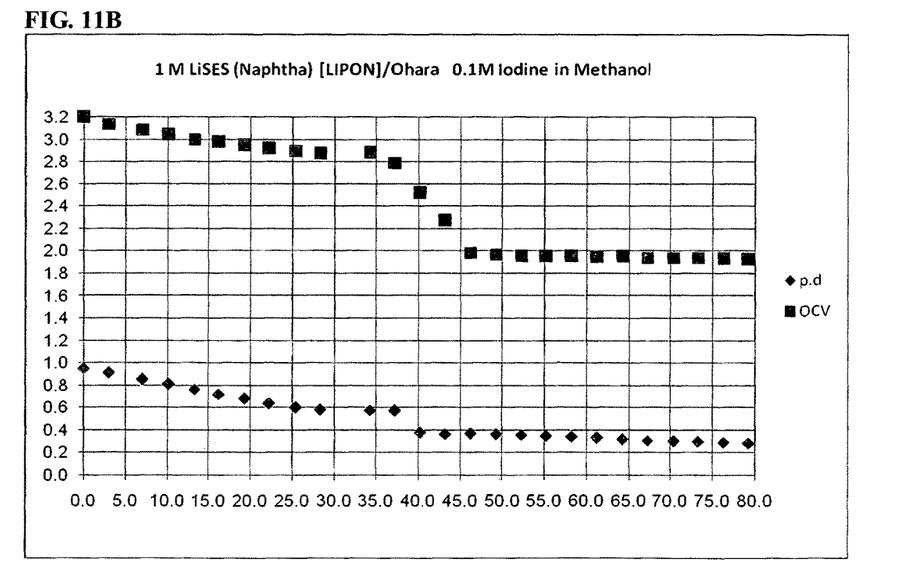
FIG. 11B shows the discharge curve of naphtha-based Li-SES vs iodine for an electrolyte membrane coated with a 0.5 μm LIPON protective coating illustrated in Example 3.

FIG. 11B shows the discharge curve of a 1.0 M naphtha-based Li-SES vs 0.1 M iodine cell for an electrolyte membrane coated with a 0.5 μm LIPON protective coating. The measured OCV is about 3.21 V.

The theoretical OCV of a 1.0 M naphtha-based Li-SES vs 0.1 M iodine cell is about 2.95 V. Based on the measured OCV of about 3.21 V for a coated electrolyte membrane, about 9% enhancement over the theoretical OCV can be achieved by providing a protective coating to the electrolyte membrane.

Figure 12:
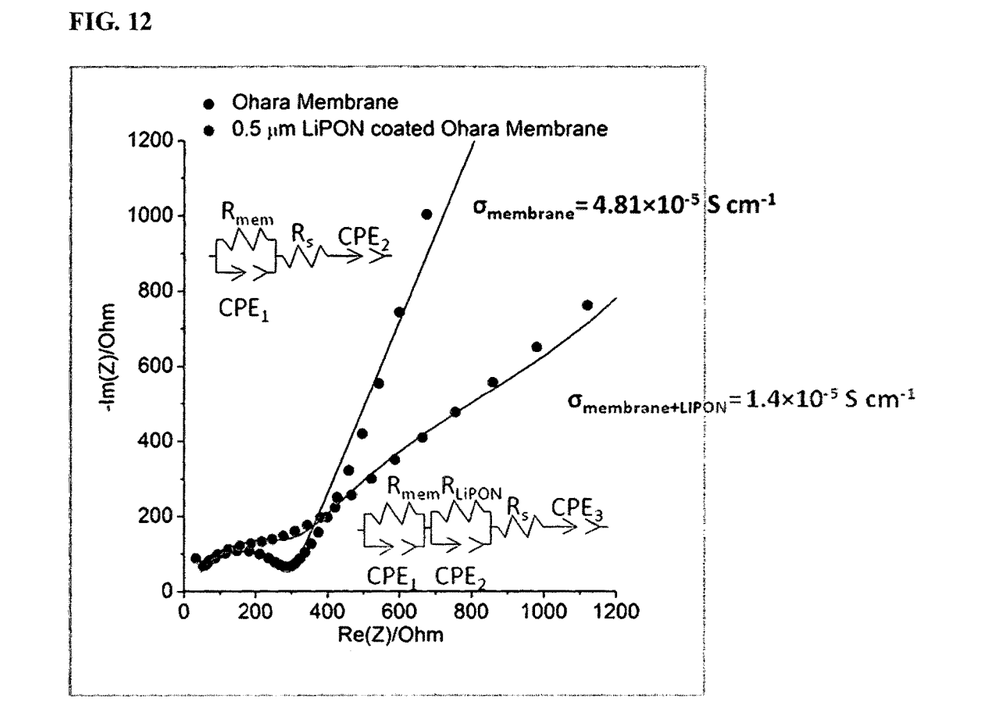
FIG. 12 shows the impedance measurements of both coated and uncoated membranes. Comparison of the two measurements indicates that the additional 0.5 μm layer of LIPON coating leads to a decrease in its ionic conductivity and an increase in the coated membrane's resistance.

FIG. 12 shows the impedance measurements of both coated and uncoated membranes. Comparison of the two measurements indicates that the additional 0.5 μm layer of LIPON coating leads to a decrease in its ionic conductivity and an increase in the coated membrane's resistance.

Figure 13:
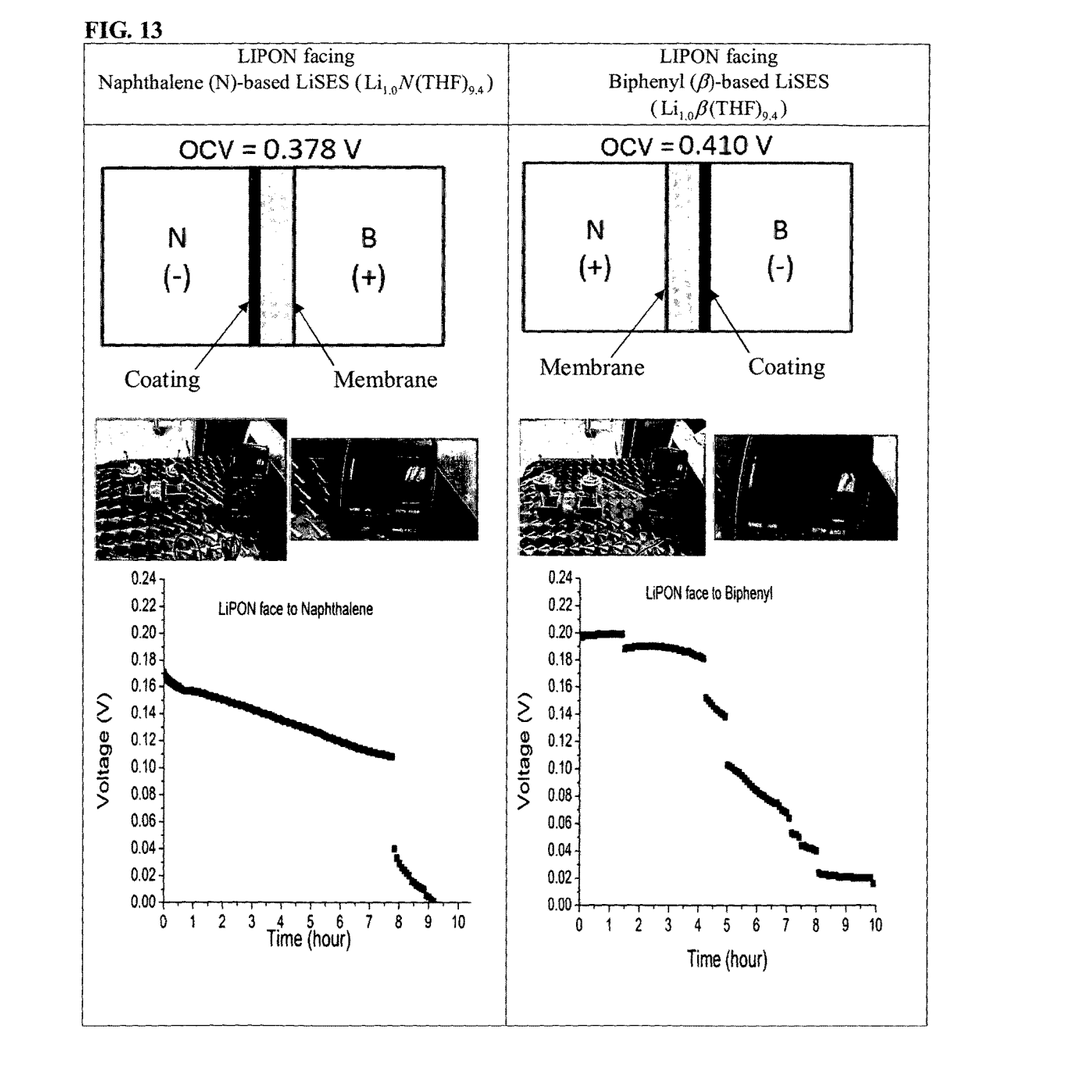
FIG. 13 shows cell configuration schematic: $Li_{1.0}N(THF)_{9.4}/LIPON/OHARA/Li_{1.0}\beta(THF)_{9.4}$, and $Li_{1.0}N(THF)_{9.4}/OHARA/LIPON/Li_{1.0}\beta(THF)_{9.4}$. Each of the cells is then discharged across a constant 1 kΩ external resistor and its voltage-time discharge curve is shown below its respective schematic and photos.

In FIG. 13, the "N"s and "B"s denote naphthalene (N)-based LiSES ($Li_{1.0}N(THF)_{9.4}$) and biphenyl (β)-based LiSES $Li_{1.0}\beta(THF)_{9.4}$ respectively. In two columns for comparison, "N" and "B" are separated by the Ohara membrane (thick) with its LIPON-coated side (thin) facing "N" in one column (cell configuration schematic: $Li_{1.0}N(THF)_{9.4}$/LIPON/OHARA/$Li_{1.0}\beta(THF)_{9.4}$), and "B" in the other column (cell configuration schematic: $Li_{1.0}N(THF)_{9.4}$/OHARA/LIPON/$Li_{1.0}\beta(THF)_{9.4}$). Each of the cells is then discharged across a constant 1 kΩ external resistor and its voltage-time discharge curve is shown below its respective schematic and photos.

Without the LIPON coating, when N and B are assembled in the cell configuration: $Li_{1.0}N(THF)_{9.4}$/OHARA/$Li_{1.0}\beta(THF)_{9.4}$, the OCV is 0.002V which indicates that both solutions have about the same electrode potential with $Li_{1.0}\beta(THF)_{9.4}$ only slightly more electropositive than $Li_{1.0}N(THF)_{9.4}$. However, when one side of the OHARA membrane is LIPON-coated, the LiSES in contact with it becomes more electronegative as seen by the increased OCV reading. The increased OCV readings occur due to an unknown redox couple reaction between the LiSES and the LIPON coating.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting" of indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. A liquid anode cell battery, comprising:
   a liquid anode comprising metal ions and an electron acceptor dissolved in a solvent; and
   an electrolyte membrane in contact with the liquid anode, wherein the electrolyte membrane is partially or completely coated with a coating protective against decomposition of the electrolyte membrane by the liquid anode.

2. The battery of claim 1, wherein the coating comprises a nitride, an oxide, or an oxynitride.

3. The battery of claim 2, wherein the coating comprises an oxynitride of boron, phosphorous, aluminum, silicon, germanium, titanium, zirconium, magnesium, calcium, barium, zinc, gallium, indium or a lanthanide metal.

4. The battery of claim 3, wherein the coating comprises lithium phosphorus oxynitride (LIPON).

5. The battery of claim 2, wherein the coating comprises a nitride of boron, phosphorous, aluminum, silicon, germanium, titanium, zirconium, magnesium, calcium, barium, zinc, gallium, indium or a lanthanide metal.

6. The battery of claim 2, wherein the coating comprises an oxide of boron, phosphorous, aluminum, silicon, germanium, titanium, zirconium, magnesium, calcium, barium, zinc, gallium, indium or a lanthanide metal.

7. The battery of claim 1, wherein the electrolyte membrane comprises a ceramic.

8. The battery of claim 7, wherein the electrolyte membrane comprises NASICON-type ceramic.

9. The battery of claim 1, wherein the metal ions are selected from the group consisting of ions of an alkali metal, an alkali-earth metal and a lanthanide metal.

10. The battery of claim 1, wherein the electron acceptor is a polycyclic aromatic hydrocarbon selected from the group consisting of biphenyl, naphthalene, azulene, 1-methylnaphthalene, acenaphthene, acenaphthylene, anthracene, fluorene, phenalene, phenanthrene, benzo[a]anthracene, benzo[a]phenanthrene, chrysene, fluoranthene, pyrene, tetracene, triphenylene anthanthrene, benzopyrene, benzo[a]pyrene, benzo[e]fluoranthene, benzo[ghi]perylene, benzo[j]fluoranthene, benzo[k]fluoranthene, corannulene, coronene, dicoronylene, helicene, heptacene, hexacene, ovalene, pentacene, picene perylene, tetraphenylene, and a mixture thereof.

11. The battery of claim 1, wherein the electron acceptor is selected from ammonia, polyaromatic-amines, metal-azaporphyrinates, diimines, methylamine, and a mixture thereof.

12. The battery of claim 1, wherein the electron acceptor is 2-amino anthracene, 1-amino anthracene, 2-aminochrysene, or 1-napthylamine.

13. The battery of claim 1, wherein the electron acceptor is an alkyl radical, an alkene radical, or an alkyne radical.

14. The battery of claim 13, wherein the alkyl radical is a n-butyl radical or a ter-butyl radical.

15. The battery of claim 10, wherein the polycyclic aromatic hydrocarbon comprises at least one of biphenyl and naphthalene.

16. The battery of claim 1, wherein the solvent is selected from the group consisting of comprises tetrahydrofuran, water, hexane, ethylene carbonate, propylene carbonate, benzene, carbon disulfide, carbon tetrachloride, diethyl ether, ethanol, chloroform, ether, dimethyl ether, benzene, propanol, acetic acid, alcohols, isobutylacetate, n-butyric acid, ethyl acetate, N-methylpyrrolidone, N,N-dimethyl formiate, ethylamine, isopropyl amine, hexamethylphosphotriamide, dimethyl sulfoxide, tetralkylurea, triphenylphosphine oxide, and a mixture thereof.

17. A battery system, comprising:
a liquid anode cell battery of claim 1; and
a liquid cathode, wherein the electrolyte membrane is also in contact with the liquid cathode, thereby separating the liquid anode from the liquid cathode.

18. The battery system of claim 17, wherein surfaces of the electrolyte membrane in contact with the liquid cathode are coated with the same protective coating.

19. The battery system of claim 17, wherein the liquid cathode is exposed to air or oxygen.

20. An electrolyte membrane for use in a liquid anode cell battery, comprising:
electrolyte membrane structure; and
a coating, made of a nitride, an oxide, or an oxynitride, that partially or completely coats the electrolytic membrane structure and is configured to protect the electrolytic membrane structure against decomposition by a liquid anode of the liquid anode cell battery.

21. The electrolyte membrane of claim 20, wherein the coating comprises an oxynitride of boron, phosphorous, aluminum, silicon, germanium, titanium, zirconium, magnesium, calcium, barium, zinc, gallium, indium or a lanthanide metal.

22. The electrolyte membrane of claim 21, wherein the coating comprises lithium phosphorus oxynitride (LIPON).

23. The electrolyte membrane of claim 20, wherein the coating comprises a nitride of boron, phosphorous, aluminum, silicon, germanium, titanium, zirconium, magnesium, calcium, barium, zinc, gallium, indium or a lanthanide metal.

24. The electrolyte membrane of claim 20, wherein the coating comprises an oxide of boron, phosphorous, aluminum, silicon, germanium, titanium, zirconium, magnesium, calcium, barium, zinc, gallium, indium or a lanthanide metal.

25. The electrolyte membrane of claim 20, wherein the electrolyte membrane comprises a ceramic.

26. The electrolyte membrane of claim 25, wherein the electrolyte membrane comprises NASICON-type ceramic.

* * * * *